United States Patent [19]

Roberson et al.

[11] Patent Number: 5,069,168
[45] Date of Patent: Dec. 3, 1991

[54] CHILD'S SAFETY HARNESS

[76] Inventors: Linda K. Roberson, P.O. Box 1518, Canler, N.C. 28715; Suzanne Mackey, 3 S. Pine Island Rd., Apt. 209B, Plantation, Fla. 33324

[21] Appl. No.: 627,193

[22] Filed: Dec. 13, 1990

[51] Int. Cl.⁵ ............................................ A01K 29/00
[52] U.S. Cl. ...................................... 119/96; 128/875
[58] Field of Search ..................... 119/96, 106; 2/246; 128/875, 874, 876; 446/268

[56] References Cited

U.S. PATENT DOCUMENTS

| | | | |
|---|---|---|---|
| 2,212,746 | 8/1940 | Nunn | 119/96 |
| 2,448,076 | 8/1948 | Bradley | 119/96 |
| 4,026,245 | 5/1977 | Arthur | 119/96 |
| 4,089,722 | 5/1978 | Holoubek | 2/246 X |
| 4,308,629 | 1/1982 | Freeman | 119/96 X |
| 4,667,624 | 5/1987 | Smith | 119/96 |
| 4,710,981 | 12/1987 | Sanchez | 2/246 X |
| 4,875,237 | 10/1989 | Cohen | 2/246 X |
| 4,975,987 | 12/1990 | Teachout et al. | 2/246 |

FOREIGN PATENT DOCUMENTS 2655489  6/1978  Fed. Rep. of Germany ........ 119/96

Primary Examiner—Gene Mancene
Assistant Examiner—R. Thomas Price
Attorney, Agent, or Firm—William F. Hamrock

[57] ABSTRACT

The invention relates to a unified safety harness worn on the upper torso of a child. It has a front vest section and a pair of criss crossing back straps. A waist belt extends around the lower section of the harness and is releasably secured at the back by a locking mechanism. A tether belt is an integral extension of the back end of the waist belt and can be either self-contained on the harness or hooked around a persons wrist. An emblem depicting a logo is secured on the front of the vest section.

15 Claims, 3 Drawing Sheets

CHILD'S SAFETY HARNESS

BACKGROUND OF THE INVENTION

1. Field of the Invention

This invention relates in general to use of a child's safety harness that contains a code for identification of the child, and in particular, to a unified safety harness for supporting the child's upper body which has a self-contained tether belt and a precoded emblem for identification of the child and adult upon registration thereof.

2. Description of Prior Art

The fear of losing a child is a very devastating thought. It is also devastating to think that a lost child could be claimed by a person who does not have authority to do so.

Any person responsible for the safety of children knows of the difficulties in managing a child in a crowded or dangerous area. Many methods have been used in locating missing children in large or crowded areas, such as, amusement parks, shopping malls, zoos, beaches, at concerts, etc. However, there is then the problem of properly identifying the child after being found and of proving that the person taking the child is the proper guardian. This is particularly true, in the case of a small toddler, who may recognize a person, but this person may not be the proper representative of the child. It is imperative that the persons responsibel for the child should be able to produce positive proof that the child is really their own.

When children reach the age of walking, it would be of great value if, parents and guardians have a device to control them that is pleasing to the eye, fairly comfortable to the child while permitting freedom of movement but still keeping the child within close range, and also permitting the adult to have freedom of both hands for use in carrying parcels and doing necessary things. It would also be of paramount value if the device possessed a means for positive identification of the child and also of the person or persons responsible for the child.

Harnesses have been used previously, yet generally parents shun the use of such, probably because children do not like them and for other problems associated therewith.

Various harness devices for children have been proposed. Such a device in U.S. Pat. No. 4,666,017 to be placed on the child only when being used as a safety device and then must be removed because its tether cannot be releasably secured to the harness. Its adjustment system is complicated because of adjustable straps in addition to an adjustable waist band. Its plain strap structure does not appear to lend support to the child's upper body. It appears that the device can be easily removed which is not a good safety feature.

Other harnesses as well as identification procedures have been proposed in the past but none of these appear to be completely satisfactory.

SUMMARY OF THE INVENTION

With the above problems of the safety of small children in focus, the present invention relates to a child's safety harness and to a code and to a procedure for positive identification of the child. Among the steps proposed in accomplishing this are the following;

Each child is registered for membership in a Child's Safety Club having its own logo. The child is given his or her own identification code. The logo and the code are imprinted on an emblem secured to the safety harness to be worn by the child. A combination coloring booklet depicting the visual use of the harness and explaining how the harness is a safety device and why it should be worn is presented to the child. A Newsletter is published by the Club having the child's code and the codes of other children who are members of the club.

The above features are intended to raise the child's esteem by being a member of a Safety Club with other children which has its own logo and having his or her own identification code. The safety education is taught by use of the coloring booklet as a means of learning and as an enjoyable experience. The Newsletter is an added feature to increase the child's interest in safety in conjunction with other children.

The present harness is a unified integral garment worn on the upper torso of the child. It has a front vest section and criss-crossing back straps. Secured to the front of the vest is the emblem depicting the logo on its exposed front side and the child's identification code hidden on its back side. A waist belt extends around the lower section of the harness and is secured at the back thereof by a locking mechanism. A tether belt is an integral extension of the free end of the waist belt and can be either self-contained on the garment or looped around a guardian's wrist.

There are many safety features of the harness. It is a unified integral garment, that is, its components are securely joined together to form a one piece garment that goes over the child's head and has a locking mechanism which prevents the child from easily removing it. Its self contained tether belt allows the child to wear the harness continuously with the tether belt secured in place. When the adult needs to have the child at close range, the releasable tether belt end is released from the harness and placed on the adults wrist to guide the child. Since the tether belt originates from the waist belt as an integral unit thereof, the tether belt is permanently fixed to the garment and cannot be entirely removed therefrom. While the tether belt is being held by the guardian, the locking mechanism on the harness cannot be unlocked.

The safety harness is constructed of heavy, strong and highly visible material for durability and safety. It allows for repeated washings and can be flame retardant. It allows for growth from year to year by needing only to be adjusted at the locking waist band, can be worn higher on the child and still retain all of its safety features.

To our knowledge no device or procedures exist which contain these features resulting in short and long range safety, prevention, identification and registration. Previous harnesses have been constructed, and a number of methods of identification have been employed, but we are not aware of any harness or identification system which has the unique features of our invention.

OBJECT OF THE INVENTION

An object of the present invention is to provide a child's harness that is simple, durable, and easy to construct.

Another object of the present invention is to provide a child's harness that is comfortable to wear, can be worn for long periods of time and cannot be easily removed.

Another object is to provide a harness having a tether belt self-contained while on the child which can be easily manipulated to be controlled by the guardian.

Another object is to provide a harness constructed of strong materials to protect the child's body.

Another object is to provide an emblem containing a logo on the harness which includes a code for identifying the child.

Another object is to provide a registration card for the guardian of the child for proper identification of the child and the guardian.

Another object is to have a Club to which the child is a member and can be identified through the logo and code on the emblem and registration card.

Another object of the invention is to provide an instructional manual and coloring booklet directed to the safety education of the child with respect to wearing the harness.

Another object is to have registration forms for membership in the club and identification of the child and proper identification of the guardian.

Another object is to have a Newsletter directed to the child's membership in the Safety Club.

The above objects are met with the present child's safety harness, the instructional and coloring booklet, the emblem, logo and code, membership in a club and forms for proper identification of the child and of the guardians.

DETAILED DESCRIPTION OF PREFERRED EMBODIMENTS

Figure 1:
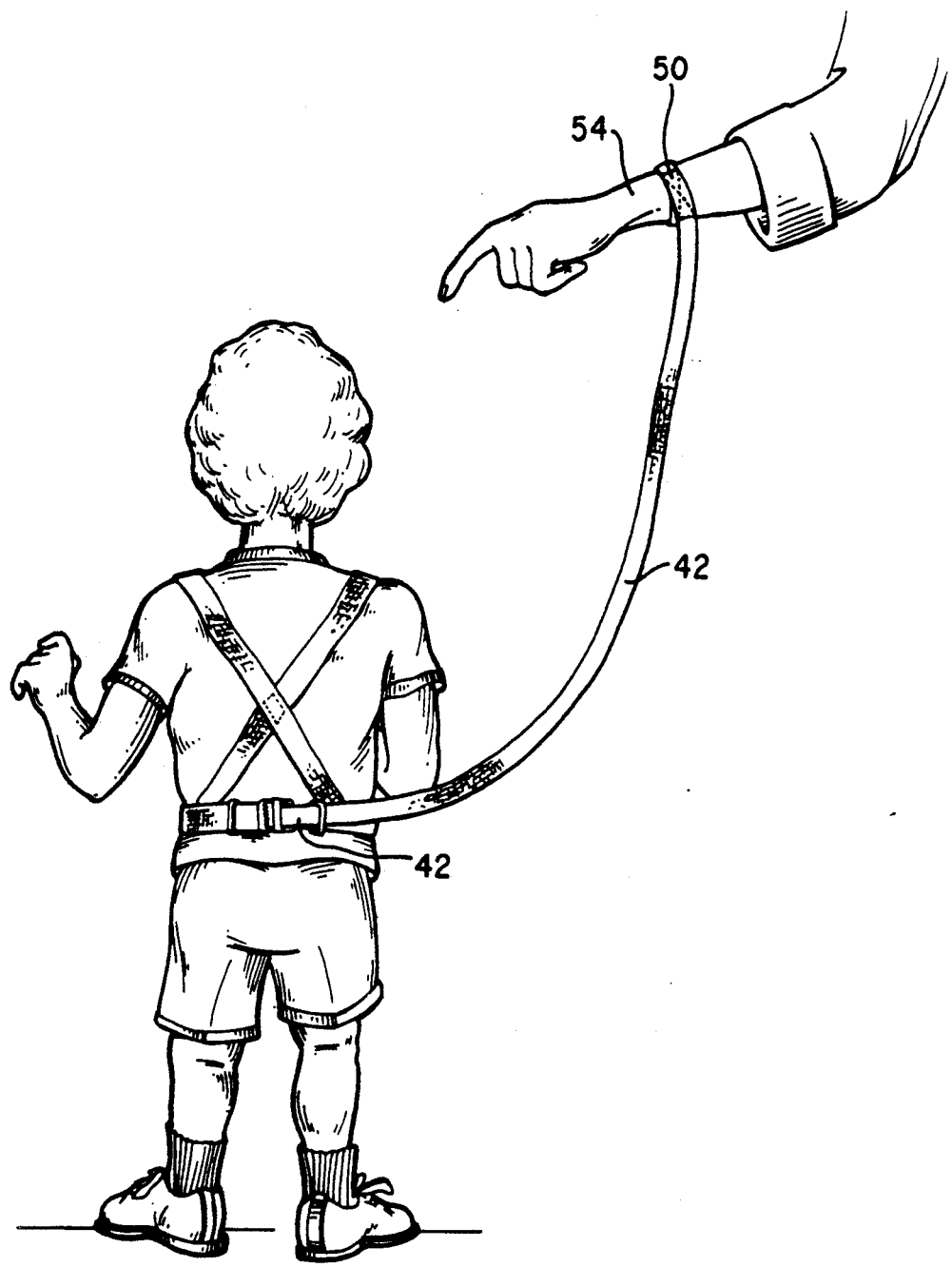
FIG. 1 is a perspective view of the harness being worn by a child.
Figure 2:
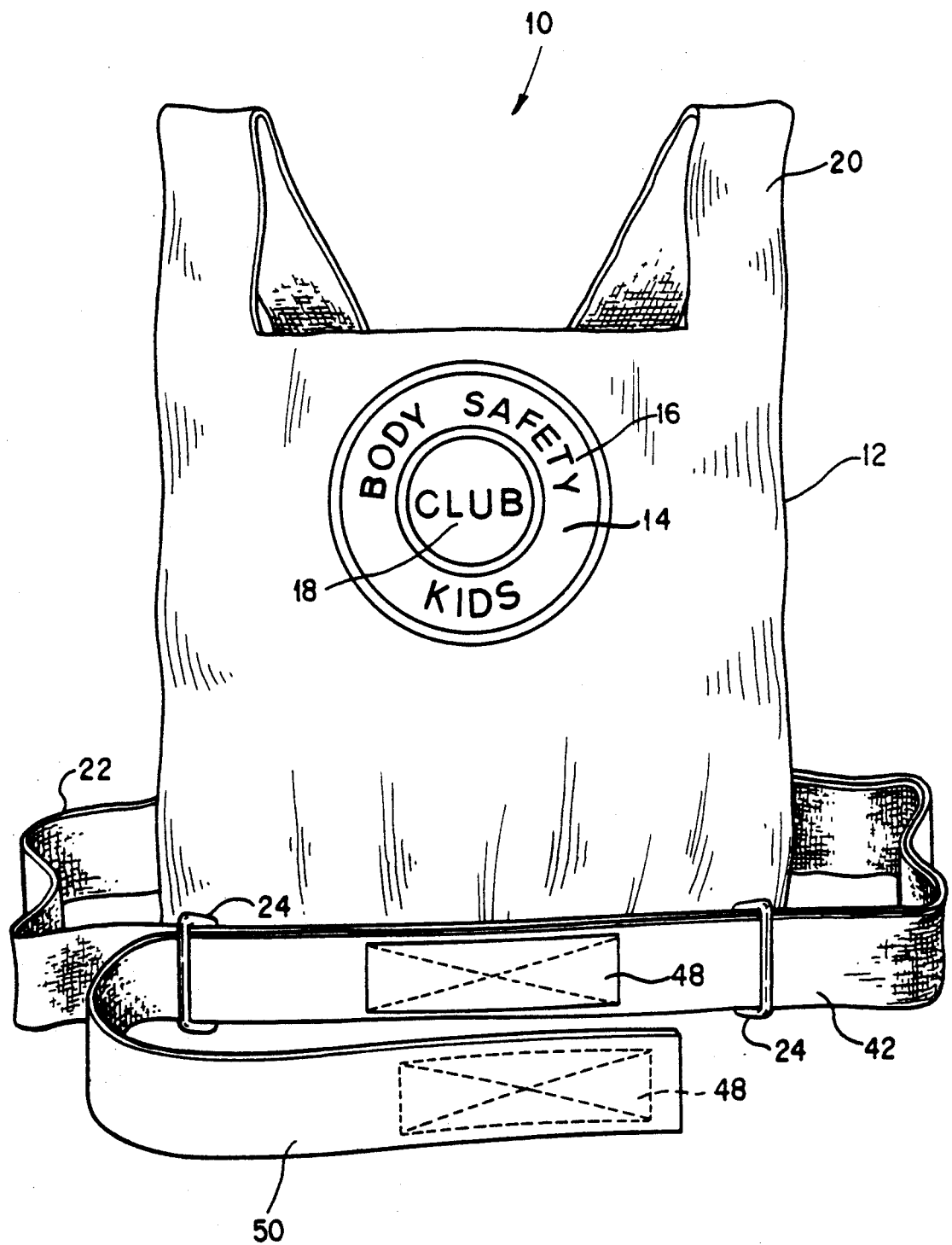
FIG. 2 is a front perspective view of the harness with the tether belt in position to be self contained thereon.
Figure 3:
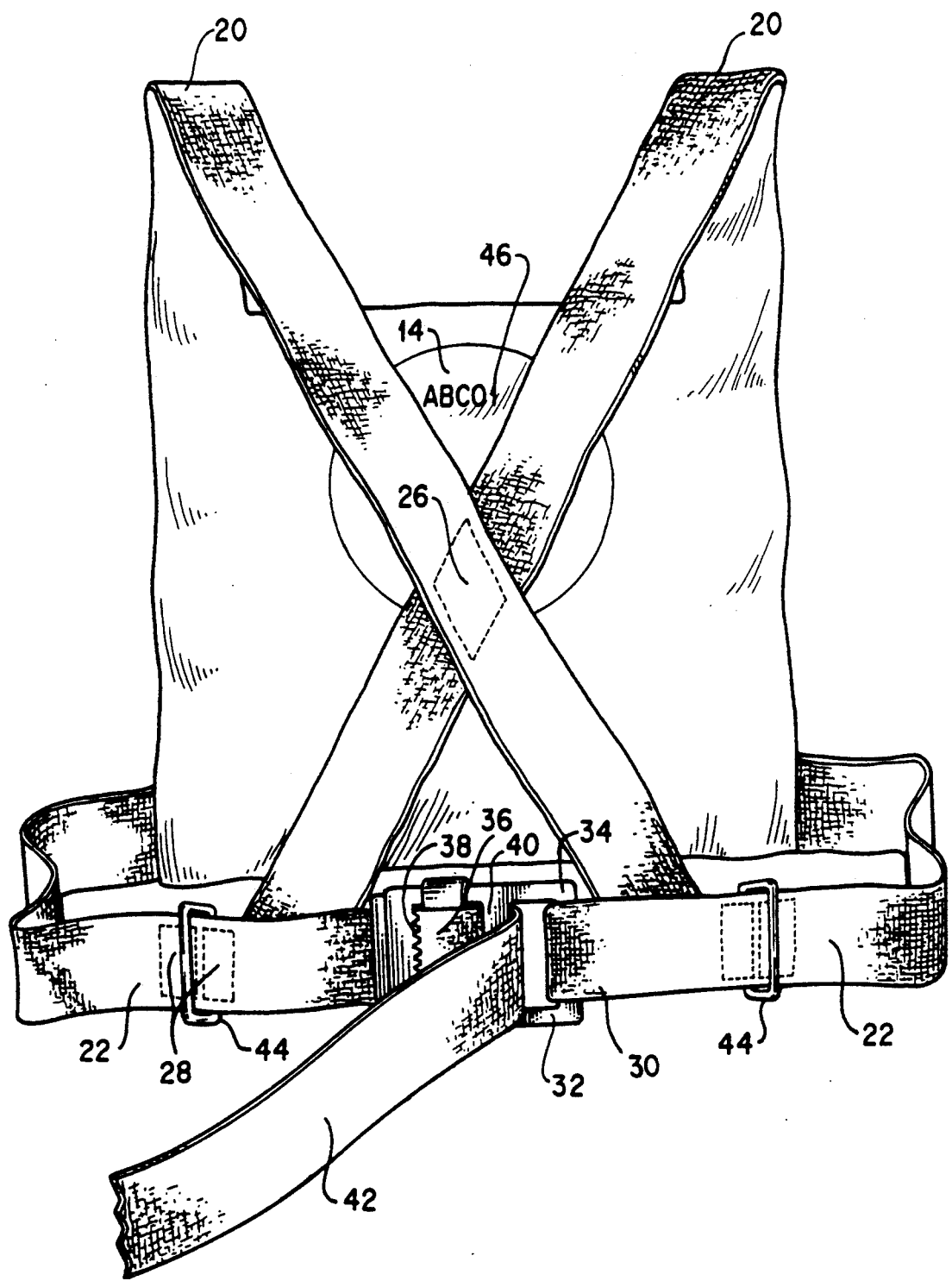
FIG. 3 is a back perspective view of the harness.

Referring to the drawings, FIGS. 1-3 illustrate vest harness 10 which supports the upper torso of the child. FIG. 2 illustrates a front view depicting front vest 12 having emblem 14 secured thereto. The emblem depicts the logo "Body Safety Kids Club" 16 which conforms to one of the inventor's trademark, U.S. Trademark Reg. No. 1,538,277, and which indicates the child's membership in the Safety Club 18. A pair of back straps 20 are seen secured to the top of front vest 12. Waist belt 22 is shown securely attached to front vest 12 by sewing or equivalent attachment. Front belt loops 24 are securely attached to the waist belt as shown.

Shown in FIG. 3 is a back view of the harness. Depicted are the criss-cross shoulder straps 20 secured by sewing 26 or other securement to give strength and permanent support to the device. The lower ends of the back straps are secured to the waist belt likewise by sewing or equivalent securement. Waist belt 22 is shown extending around the back section of the harness with fastened end 30 permanently secured on belt buckle 32 around belt buckle bar 34. The opposite free end element 36 of waist belt 22 is adjustable secured to belt buckle 32 by locking teeth 38 or similar attachment as shown. At this point, waist belt 22 extends through belt buckle bar 40 to become tether belt 42. Back belt loops 44 are shown attached to waist belt 22 and identification code 46 is shown enscribed on the back of emblem 14.

FIGS. 1 and 3 show tether belt 42 extending from belt buckle 32 and terminating into releasable tether loop 50.

The tether loop is formed by joining together self-adhesive tether loop sections 48, such as VELCRO, attached to opposing sides of the tether at its free end. As seen in FIG. 1, the harness is being worn by a child under the control of a guardian. Tether belt 42 is shown extended with releasable tether loop 50 encircling the guardian's wrist 54. Any movement by the child is transferred to the tether belt and is immediately felt by the guardian.

The harness can be worn by the child as a garment when the child is not under the manual control of the guardian. The preferred method of doing this is to wear the tether belt self contained on the harness. An appropriate procedure in doing so is to pass the tether belt through a back loop 44, through front loops 24 and through the other back loop 44 around the waist belt until the tether belt is secured on the waist area and releasable tether loop sections 48 oppose each other as shown in FIG. 2. The opposing tether loop sections 48 are then adhered together around a front or back loop 24 or 44 to be self contained on the harness. Another procedure is to initially form releasable tether loop 50 and then passing the tether through front and back loops 24 and 44 to be self-contained on the harness. The procedure followed will depend upon factors such as size of the child's waist and preference.

The harness is constructed with relatively strong fabric material which is highly visible and can be flame retardant. The parts are secured by sewing usually with strong threads preferably applied by industrial machinery. The front vest is preferably constructed with double layers of material that will secure to the straps, waist belt and tether belt. Heavy ply nylon webbing has proven to have the best characteristics required for the backstraps, waist belt and tether belt. Strong cotton webbing also has been successfully used having a one inch width and ⅛ inch thickness to produce adequate strength for the belt. The secured criss-crossed back straps portions of the webbing give strength to the harness back portion and allows for proper fitting for the growth of the child, while still allowing for the fitting of the harness over the child's head.

Belt loops 24 and 44 are preferably made of metal or equivalent material and are secured beneath the waist belt preferably by a secured layer of the webbing 28 for loops 44 and by a reinforced layer of the front vest fabric for loops 24. The preferred belt buckle is a strong metal buckle with at least double bar openings containing locking teeth. Waist belt 22 is then secured within the locking teeth to overcome any pressure exerted by attempting to pull it apart. Equivalent belt buckles of equal strength and durability are applicable.

Major features of the safety harness are that it is a unified vest harness that fits over the head of the child; it is difficult to remove not only by the child but also by any person attempting to run off with the child; it helps to support the child's upper body and allows for the child's growth; it is durable, washable and has its own self-contained tether belt which will be always available for attaching to the guardian's wrist and cannot be easily removed by an unauthorized person when so attached. It can be worn for long periods of time and is versatile enough to be worn to any event or recreation; it also represents a sense of membership and peer status to the child, and aids the child in safety learning. To the guardian, the use of a safety harness by the child is a safety measure in that it is used as a means to properly identify the child by another and of the person claiming the child.

The growth feature of the harness is that it can grow with the child allowing it to be used for a number of years. This is so because the waist belt can be adjusted by belt buckle 32 permitting expansion of the garment with the increased growth of the child. Also, the harness can be worn higher on the waist up onto the chest of the child making a bib vest harness as the child increases in height and retains its safety features.

An instruction and coloring booklet is available from the Safety Club. The booklet is pictorial and contains a written description of the safety and wearing elements of the harness. By reviewing the pages and coloring the pictures, and being read the descriptive elements of the booklet by the guardian, the child is able to become aware of the important features of wearing the harness. When viewed by the child, the coloring pages are descriptive of the child wearing the harness at various events for safety. When coloring the pictures, it hopefully will reinforce all of the safety elements of wearing the harness.

Emblem 14, as illustrated in FIG. 2, displays logo 16, which, conforms to U.S. Trademark Reg. No. 1,538,277, showing the name of the Club organization- BODY SAFETY KIDS CLUB. The logo is intended to alert the public that the child is a member of the Safety Club. With respect to the code identification 46 shown on back of the emblem in FIG. 2, the code can be applied by any permanent marking method. From this code, the authorities will then be able to contact the Club and to initiate the identification procedure. U.S. Trademark Reg. No. 1,538,277 is registered to one of the inventors.

There is a Registration Form to be filled out by the guardian for registration in the Club. The top portion of the form is detachable so that it can be maintained in possession of the guardian at all times. Code 46 on the back of emblem 14 corresponds with the code and information on the Registration Form to insure that a lost child is returned to the proper guardian.

There is a child's Membership Form certificate. The certificate is intended to be displayed by the child. It is intended to give the child recognition for their interest in safety, and the safety features of the use of a harness, code, and other safety features. It will display logo 16 on emblem 14 carrying code 46 on the harness. No code number will be displayed on this certificate. It is a merit for safety learning, practice and is given for peer interest in safety.

There is a copyrighted Newsletter which serves as a confirmation of registration for the child to the Club for identification purposes should the child ever be missing wearing the harness. The Newsletter features for the child is recognition and also a list of other members' codes in the same Club. The Newsletter preferably is used for these purposes and gives only the code the child is registered under, the date of purchase of the harness and the city and state, no other vital information is given out to the public.

While certain novel features of this invention have been shown and described, it will be understood that various changes in the forms and details of the harness and associated safety applications illustrated and in the operations thereof can be made by those skilled in the art without departing from the spirit of the invention.

What is claimed is:

1. A safety harness for a child comprising a unified vest harness including a front vest, a pair of criss-crossing back straps, a waist belt, a tether belt and an adjustable means, the front vest adapted to cover the upper front torso of the child, the back straps adapted to fit over the back of the child in a criss-crossing fashion from top to bottom and be permanently secured to the top of the front vest and at the bottom to the waist belt, the waist belt adapted to encircle the front and back torso of the child, and having the front encircling portion of the waist belt permanently secured to the bottom of the front vest, and having one end of the back encircling portion of the waist belt adjustably positioned along the waist belt and secured by the adjustable means, the other end of said back encircling portion extends beyond said harness to form a tether belt and adapted to terminate around a person's wrist or to be releasably secured around the waist belt, the adjustable means allows the waist belt to be varied in size which varies the length of the tether belt at the back of the child, whereby said harness is put on over the head and secured by said adjustable means to help support the child's upper torso, and whereby said tether belt can be worn either encircling the waist belt and attached thereon or exceeded freely from the adjustable means to be held by a person.

2. A safety harness according to claim 1 which is prepared from fabric material.

3. A safety harness according to claim 2 wherein front vest is prepared with a double layer of fabric.

4. A safety harness according to claim 3 wherein the back straps are secured at the criss-crossing point of contact.

5. A safety harness according to claim 1 wherein the tether belt is self-contained on the waist belt.

6. A safety harness according to claim 5 wherein the adjustable means is a double bar belt buckle with locking teeth.

7. A safety harness according to claim 6 wherein belt loops are attached to the waist belt to contain said tether belt.

8. A safety harness according to claim 7 wherein the free end of the tether belt is releasably self-contained on the waist belt by adhesive means attached to the tether belt.

9. A safety harness according to claim 8 wherein the tether belt is releasably self-contained by folding it over a belt loop and joining adhesive containing end areas.

10. A safety harness according to claim 9 wherein said tether belt is released from the waist belt and is held releasably self-contained on a persons wrist.

11. A safety harness according to claim 5 wherein the waist belt, back straps, and the tether belt are prepared from nylon webbing.

12. A safety harness according to claim 1 wherein an emblem containing an identification code for the child is secured thereto.

13. A safety harness according to claim 12 wherein said emblem contains a logo for identification.

14. A safety harness according to claim 12 wherein the emblem is located on the exterior of the front vest.

15. A safety harness according to claim 14 wherein the identification code is located on the back of the emblem and is visible only on the underside of the front vest.

* * * * *